United States Patent [19]

Haskins et al.

[11] Patent Number: 4,491,696

[45] Date of Patent: Jan. 1, 1985

[54] TELEPHONE SET BASE

[75] Inventors: Steve W. Haskins, Mount Juliet; James K. Vincent, Antioch, both of Tenn.

[73] Assignee: Northern Telecom Limited, Montreal, Canada

[21] Appl. No.: 513,911

[22] Filed: Jul. 14, 1983

[51] Int. Cl.³ .............................................. H04M 1/04
[52] U.S. Cl. ................................................. 179/100 C
[58] Field of Search ........... 179/100 C, 100 D, 100 R, 179/100 L

[56] References Cited

U.S. PATENT DOCUMENTS 3,941,951 3/1976 Engstrom et al. .......... 179/100 C X
4,292,477 9/1981 Adams et al. ................... 179/100 C
4,349,706 9/1982 Thompson ...................... 179/100 C

FOREIGN PATENT DOCUMENTS 2014961 10/1971 Fed. Rep. of Germany.

Primary Examiner—Gene Z. Rubinson
Assistant Examiner—James L. Dwyer
Attorney, Agent, or Firm—Schwartz, Jeffery, Schwaab, Mack, Blumenthal & Koch

[57] ABSTRACT

A telephone set base is arranged for either desk or wall mounting by the provision of a wedge-shaped adaptor attached to the bottom of the bottom housing of the base. For desk mounting the thicker end of the wedge is at the back and in wall mounting the thicker end is at the bottom. A low profile is provided by mounting arrangements for components, and only a single line cord jack need be provided. The top housing can provide for alternative features.

25 Claims, 18 Drawing Figures

TELEPHONE SET BASE

This invention relates to a telephone set base, particularly to a bottom housing for a base, a top housing for attachment to the bottom housing, and an adaptor for attachment to the outer bottom surface of the base in either of two orientations to adapt the telephone set base for either wall mounting or desk or table top mounting. It is a feature of the invention that the telephone set base is of minimal height to produce a telephone set of low overall vertical profile.

The requirement of a low profile, ability to mount on a vertical or horizontal surface at the decision of the user, and the provision of other features to produce an attractive but also relatively inexpensive telephone set creates a number of problems. In meeting these problems the efficiency of the telephone set must not be impaired. Thus the use of an adaptor should not result in a fragile assemble. While the user should be able to assembly the adaptor to the bottom of the base easily, the assembly should be able to withstand dropping.

The ability to mount on a wall or a desk affects the hook switch, which must operate effectively, without need of adjustment, in either orientation. With a low profile, access to the means for mounting sub-assemblies such as a dial becomes a problem which needs to be solved without expensive or labour intensive results.

The present invention overcomes the various problems as outlined above, and also provides other fixtures, as will be appreciated from the description. For example, only one line cord jack is provided, and is used in both wall and desk mounting, access to the jack being via the adaptor in both circumstances. The top housing can provide for alternative features and is in a plurality of parts attached together. By changing one part, various alternative arrangements can be provided while the main portion of the top housing is not changed.

The invention will be readily understood and the various features appreciated from the following description of a particular telephone set base in conjunction with the accompanying drawings, in which.

Figure 1:
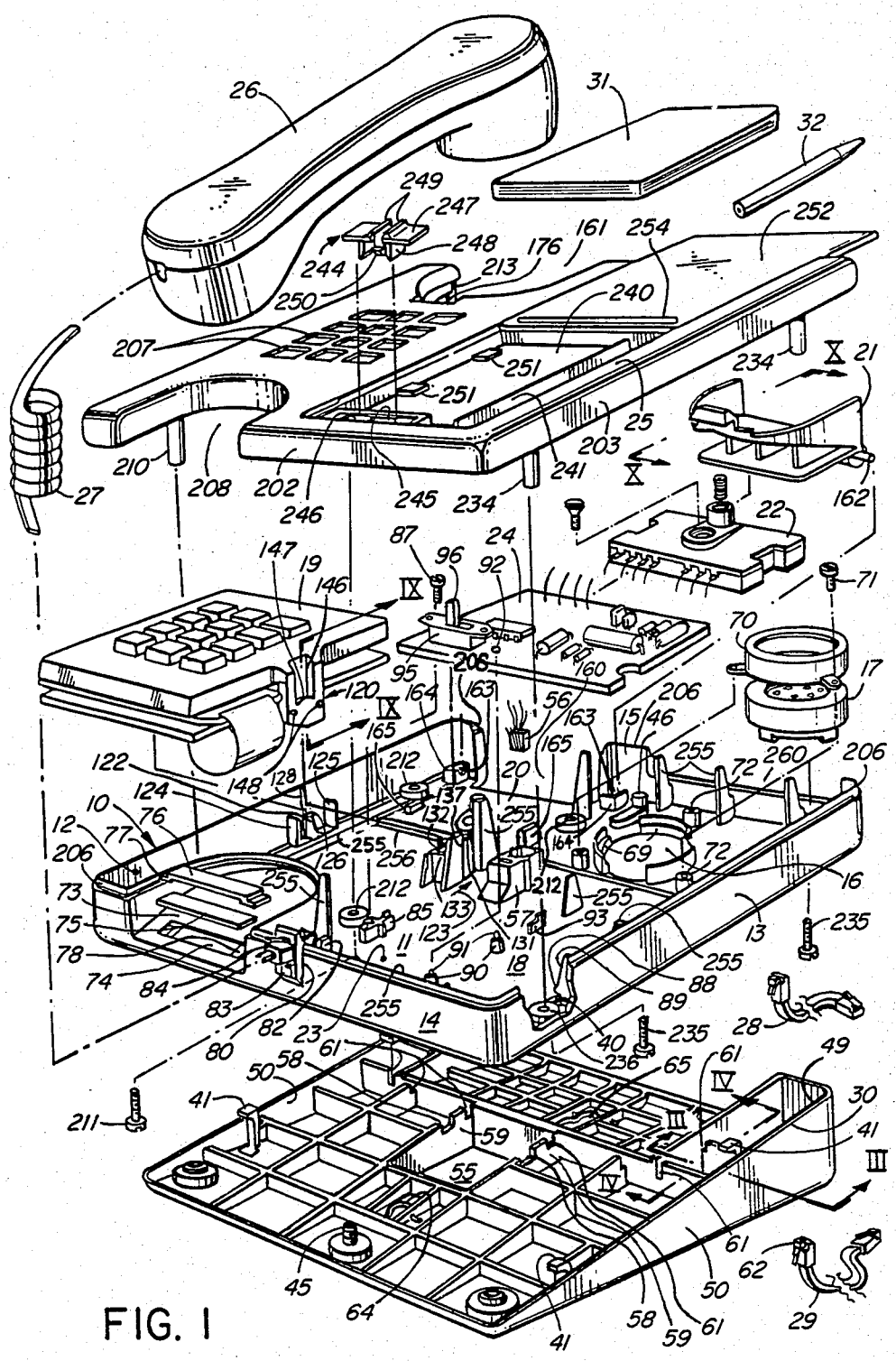
FIG. 1 is an exploded perspective view of one form of telephone set base in accordance with the invention.

Considering FIG. 1, there is illustrated a bottom housing 10, rectangular in plan form, having a bottom surface 11, opposite sides 12 and 13, a front end wall 14 and a rear wall 15.

Within the bottom housing are various mounting positions, such as a mounting position 16 for a ringer 17, a mounting position 18 for a dial assembly 19, a mounting position 20 for a combined or integral cup and hook switch assembly comprising cup 21 and switch 22, and mounting position 23 for a circuit board 24. These mounting positions are indicated generally and will be described in more detail. Other features will also be described.

Also seen in FIG. 1 is the top housing indicated generally at 25 and described in more detail with respect to FIGS. 14-18; a handset 26; handset cord 27; two alternative line cords 28 and 29 for wall and desk mounting respectively; a wedge-shaped adaptor 30 which attaches to the bottom surface of the bottom housing; and a pad 31 and pencil 32 which can be provided with the particular form of top housing illustrated.

Figure 3:
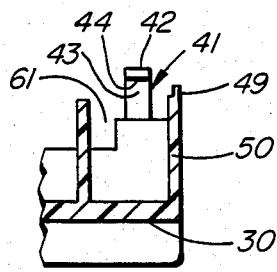
FIG. 3 is a cross-section through the adaptor on the line III—III of FIG. 1.
Figure 4:
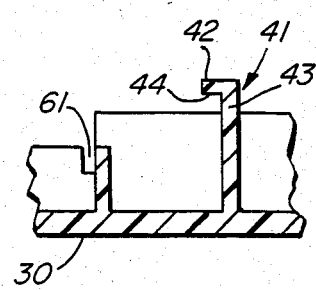
FIG. 4 is a cross-section through the adaptor on the line IV—IV of FIG. 1.
Figure 5:
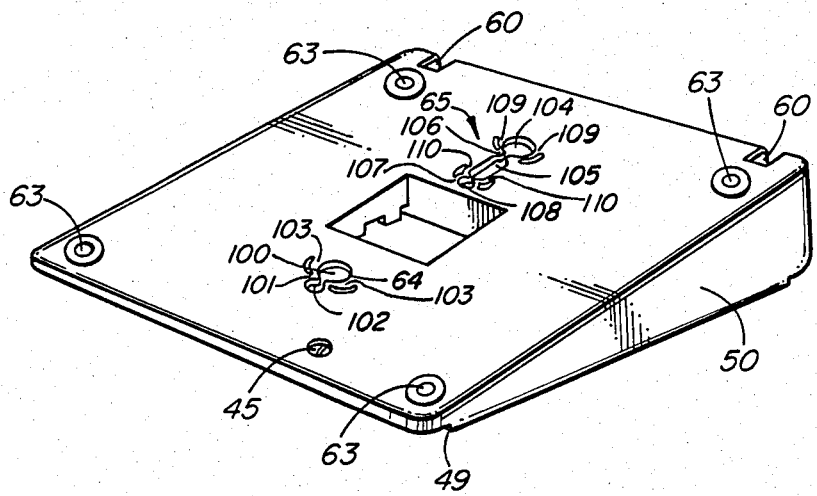
FIG. 5 is a perspective view on the outer bottom surface of the adaptor.

The adaptor 30 is attached to the bottom housing 10 by means of hooks which extend from the adaptor and pass up through apertures in the bottom surface 11 of the bottom housing. These apertures 40 can be seen in FIG. 2, one also being seen in FIG. 1. The hooks 41 are seen in FIG. 1, and also one of the hooks is seen in more detail in FIGS. 3 and 4. The hooks differ at one end of the adaptor relative to the hooks at the other end, but only in the manner of forming the connection with the main body of the adaptor. Each hook is the same for the operative part, at the top, having a flange or web 42 extending from a stem 43. The undersurface 44 of each hook is positioned so as to be in close sliding contact with the inner surface of the bottom surface 11 of the bottom housing 10 after the hooks have been passed up through the apertures 40. The adaptor can be attached in either orientation, that is with the thinner end of the adapter towards the front of the bottom housing or towards the back.

Figure 2:
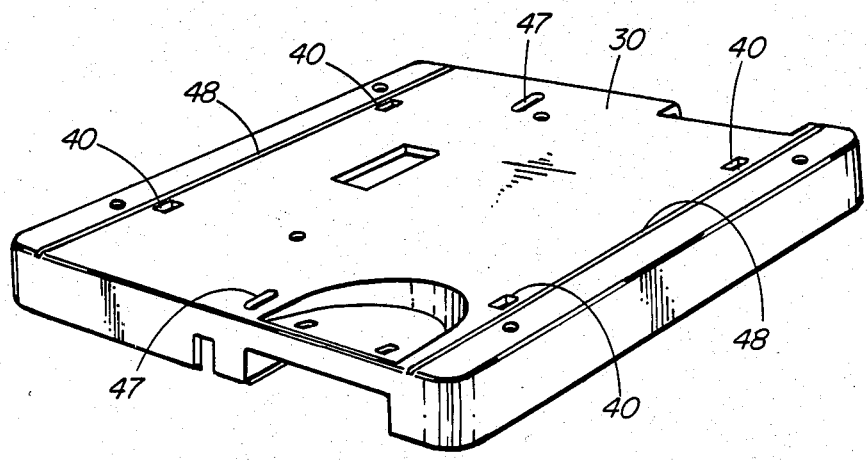
FIG. 2 is a perspective view on the outer bottom surface of the bottom housing.

Once the adaptor has been attached by the hooks, it is held from moving by a captive screw 45, in the adaptor, which screws into one or other of two bosses on the bottom surface of the bottom housing. One such boss is indicated at 46 in FIG. 1, the other one not being seen at the other end. As it is necessary for the end of the screw 46 to slide in the bottom housing when the adaptor is attached, elongated slots, seen at 47 in FIG. 2, provide for this. The boss into which the screw 45 screws is at one end of this slot.

When the adaptor is attached to the bottom housing by the hooks 41 and screw 45, it is somewhat fragile in that inadvertent dropping of the base could break one or more of the hooks 41. The attachment can be strengthened by forming grooves in the outer bottom surface of the bottom housing and cooperative ribs on the adaptor. Two grooves 48 are shown in FIG. 2, one along each side of the bottom housing. Ribs 49 are formed on the top edges of the side walls 50 of the adaptor, seen in FIG. 1 and FIG. 3.

A large central aperture 55 is provided in the bottom surface of the adaptor. This provides access to the jack in the bottom housing. The jack is formed of two parts 56 and 57, which are bonded or otherwise united. The large aperture also provides for the addition of a "bean bag" base. A plate on the bean bag can be pushed up into the aperture 55, with snap-in projections engaging, for example, in grooves 58 in webs 59 in the adaptor. The plate would have access therethrough to the jack.

For wall mounting, a short line cord 28 is used, one end inserted into a wall outlet jack and the other inserted into the jack in the bottom housing. For desk top mounting a long line cord 29 is used. One end is inserted into a suitable outlet and the other end is fed through the adaptor. This is different in that it is normal for a desk mounted telephone set to have the line cord inserted into an alternative jack positioned at the back end of the bottom housing. In the present example, the plug is fed through one of two alternative apertures or slots 60 at the thicker end of the adaptor, and then the cord is routed via small slots or grooves 61 in the various webs in the adaptor. The slots 60 are large enough in the bottom surface of the adaptor for passage of the plug 62 of the line cord. The extensions of the slots 60 into the end wall of the adaptor need only be big enough to accept the cord.

The adaptor also has four feet 63 provided, one near each corner and two keyhole slots 64 and 65 for attachment to studs on a wall outlet. The feet 63 can have elastomeric members for assistance in holding the base still. The keyhole slots are arranged to accept two different stud pitches by making one slot 65, of extended form with two alternative holding positions, while slot 64 has one holding position. Thus, what would be the top slot in a wall mounting mode i.e. the slot 64, has a main circular portion 100 and waisted slot portion 101 opening into a further circular portion 102 of smaller diameter than portion 100 but larger than the width at portion 101. The waisted portion 101 is defined by opposed resilient arcuate members 103 forming parts of the periphery of the circular portion 100. The lower slot—slot 65, is more elongate in formation, having a circular portion 104, an elongate slot 105 having waisted portions 106 and 107 at each end and a smaller circular portion 108. The waisted portion 106 is formed by opposed resilient arcuate members 109, as for slot 64, while the waisted portion 107 is formed by opposed arcuate members 110. By providing the elongate slot 65, different spacing of mounting studs can be accommodated. To mount the set, the heads of the mounting studs are inserted through the portions 100 and 104 and the base slid down, the heads of the studs on the inner surface of the base member. For more widely spaced studs, both heads are entered through portions 100 and 104 at the same time and the stems of the studs snap past the portions 101 and 106, the top stud then being in position 102 and the bottom stud in the slot 105. For close spaced studs, the head of the lower stud is first entered through circular portion 104 of the lower slot 64, the base slid down with the neck of the lower stud snapping past waisted portion 106, then the head of the upper stud is entered through the circular portion 100 of upper slot 65. Further downward sliding of the base snaps the studs through waisted portions 101 and 107.

The tone ringer 17, illustrated in FIG. 1 is a normal telephone receiver, and rests in a cup 69 formed at mounting position 16 and is held in place by a cover 70, held to the bottom housing by screws 71 threading into bosses 72. Other forms of ringer may be provided, and also different forms of mounting. The cup 69 forms one of the cavities normally associated with a ringer, or similar transducer.

At the forward end of the bottom housing is a cup or recess 73 for reception of the transmitter end of the handset 26. Formed in the bottom surface of the cup 73 is an elongate recess 74 in which can be positioned a card 75 with the station identification thereon. A transparent cover 76 clips on over the card, the ends 77 of the cover passing through a slot 78 at each end of the recess 74.

Also at the forward end of the bottom housing is a slot 80 in the wall 14 and a formation 82. A jack 83 fits into the formation 82, with access to the jack via the slot 80. The plug 84 on the handset cord 27 is inserted into the jack 83.

The circuit board 24 is located in the bottom housing by a plurality of locating members. The circuit board can be of varied size depending upon services provided. One edge of the board rests on a ledge 85 which includes a boss 86 for reception of a screw 87. At the opposite edge the board rests under projections 88 on ribs 89 formed as part of wall 13. The board also rests on two pillars 90, which have small protrusions 91 at their top ends. The board is provided with two holes accurately located and the protrusions fit in the holes, one of which is seen at 92. This accurately positions the board, which is held down also by the screw 87. Additional ribs 89, and an additional locating member 93 enable wider boards to be mounted.

It is desirable, in the present example, to accurately locate the circuit board, as the example illustrated has a volume control 95 with a laterally sliding control member 96. As will be described later, a sliding actuator in the top housing engages over the control member 96.

The dial assembly 19 is mounted in the bottom housing by means of two mounting brackets 120 on the dial assembly, only one being seen in FIG. 1, and two support brackets 122 and 123 extending up from the bottom surface 11 of the bottom housing 10. In the example, support bracket 122 is integral with side wall 12 while support bracket 123 is positioned towards the center of the housing.

Figure 6:
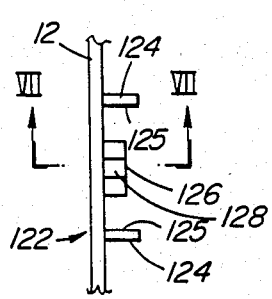
FIG. 6 is a plan view on one of the support brackets for the dial assembly.
Figure 7:
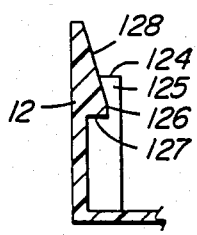
FIG. 7 is a cross-section on the line VII—VII of FIG. 6.

The bracket 122 is seen in more detail in FIGS. 6 and 7. The bracket comprises two spaced apart webs 124 extending inward normal to the side 12. The webs 124 provide opposed guide surfaces 125. Between the webs 124 is a latching member 126 having a downwardly facing latching surface 127. The latching member 126 extends inwardly from the side 12 and extending down from the top of the side 12 is a downwardly and inwardly inclined surface or ramp 128. The latching member 126, and latching surface 127, are arcuate, the surface 127 being concave.

Figure 8:
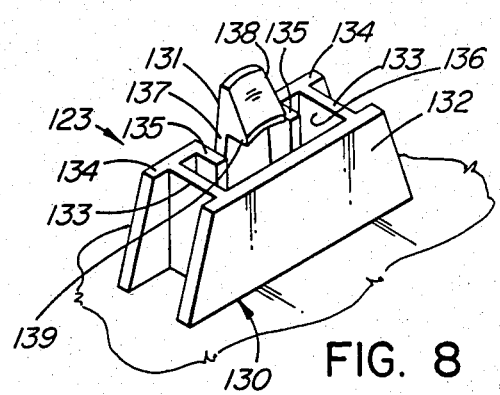
FIG. 8 is a perspective view of the other support bracket for the dial assembly.

The bracket 123 is seen in more detail in FIG. 8. The bracket comprises a channel-shaped member 130 with a separate latching member 131. The member 130 has a back flange 132 and two parallel spaced apart webs 133 extending forward from the back flange 132, toward the side 12 and bracket 122. At the inner edge of each web 133 is a narrow flange 134 extending sideways on each side of each web 133. At the opposed edges of the flanges 134 are ribs 135 extending towards the back flange 132. The opposed inner surfaces 136 of the webs 133 form guide surfaces. The latching member 131 is resiliently deformable in a direction away from the back flange 132. The member 131 comprises a thin web 137 with a projecting rib 138 at the top end, the rib having an arcuate, downward facing, latching surface 139, the surface 139 being concave. The rib 138 has a downward and inwardly inclined surface or ramp 140 extending to the latching surface 139.

Figure 9:
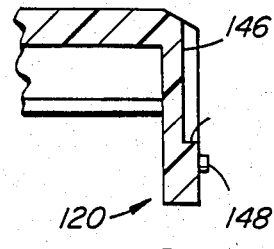
FIG. 9 is a cross-section through one of the mounting brackets on the dial assembly generally on the line IX—IX of FIG. 1.

The mounting brackets 120 on the dial assembly are illustrated in more detail in FIG. 9. In the example, the brackets 120 are formed on each side of the bezel member 145, which is the uppermost member of the dial assembly. The brackets extend downwards and are of a width that they will slide down between the guide surfaces 125 on bracket 122 and between guide surfaces 136 on bracket 123. In addition, a bracket 120 slides down between the inner edges of the ribs 135 and the front surface of the back flange 132 of bracket 123. Each bracket 120 has a recess in the form of a groove 146 extending part way down the bracket and having an arcuate bottom surface 147, the surfaces 147 being convex. The arcuate surfaces 147 are positioned so as to engage under the surfaces 127 and 139 on the brackets 122 and 123. On the outer surface of each bracket 120 are two small protrusions 148. The protrusions 148 on one bracket 120 slide down in channels formed by the ribs 135 and webs 133 in bracket 123 and are in contact with the flanges 134. On the other bracket 120 the protrusions 148 are in contact with the side 12 of the base.

The dial assembly is mounted on the base by initially lining up the mounting brackets 120 over support brackets 122 and 123. One side of each mounting bracket is pushed against a guide surface 125 and a guide surface 136 and the dial assembly pushed down. To ease initial alignment and interengagement of mounting brackets 120 with support brackets 122 and 123, the bottom edge of each mounting bracket 120 is chamfered, at 150. Thus one side of each bracket 120 can be aligned and initially inserted before the other side starts to insert.

The brackets 120 are moved down in contact with the ramps 128 and 140. This deflects or deforms the latch member 131 until the surfaces 147 on the brackets 120 are below the surfaces 127 and 139 when latch member 131 can snap back, pushing the surface 147 on one bracket 120 under the latching surface 127 on bracket 122, and the latching surface 139 moving over the surface 147 on the other bracket 120. At this time the bottom edges of the brackets 120 will be in contact with the bottom surface 11 of the base. The dial assembly is then held firmly in place. The dial has been positioned purely by vertical movement and no access to a side has been necessary to tighten holding fixtures.

To remove a dial assembly, a flat member, for example a screwdriver, is pushed down between the bottom of a recess 146 and the ramp 140 to deflect the latch member outward, releasing latching surface 139 from surface 147 on the related bracket 120. The dial assembly can be lifted at the one side slightly and then eased sideways, further deflecting latching member 131, and the brackets 120 and 122 disengaged and the dial then lifted up. Again removal is by vertical movement and access is only needed from the top. No side access is required to loosen fastening devices. It is therefore possible to mount the dial assembly up tight against a side of a housing, as in FIG. 1. It is also possible to closely mount other components very close to the edges of the dial assembly. The vertical profile can be very low, corresponding to the height, or thickness of the dial assembly, if desired. The above described mounting of a dial assembly is described in application Ser. No. 486,721 filed in the name of the present assignee.

FIGS. 10 to 13 illustrate in more detail the integral cup and hookswitch arrangement. At the rear edge or end of the bottom housing, as seen in FIG. 1, a wide slot 160 is formed in the wall 15 and a U-shaped opening 161 is formed in the top housing 25 at a rear edge. Cup 21 is aligned with the slot 160, the cup 21 having laterally extending pivot members 162 which rest in grooves or slots 163 having semicylindrical bottom surfaces, the slots 163 formed in brackets 164 extending up from the bottom surface 11 of the base housing. Positioned on the bottom surface 11 of the bottom housing 10 is the hookswitch 22, the hookswitch located by two ribs extending up from the bottom surface 11.

Figure 10:
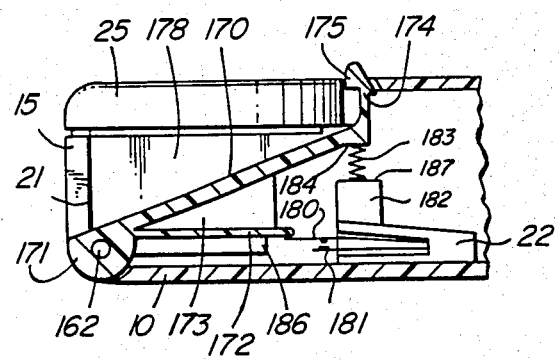
FIG. 10 is a diagrammatic cross-section on the line X—X of FIG. 1, the cup assembled to the bottom housing, in an off hook position.
Figure 11:
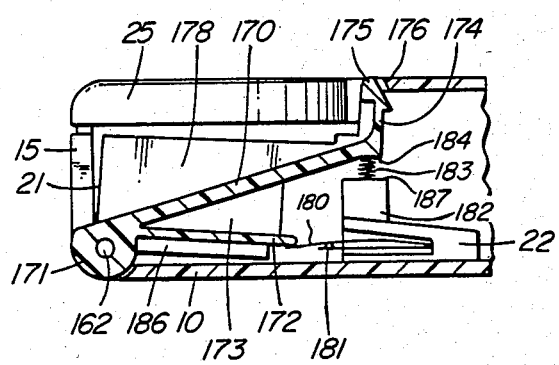
FIG. 11 is a cross-section similar to that of FIG. 10, but with the cup in an on hook position.
Figure 13:
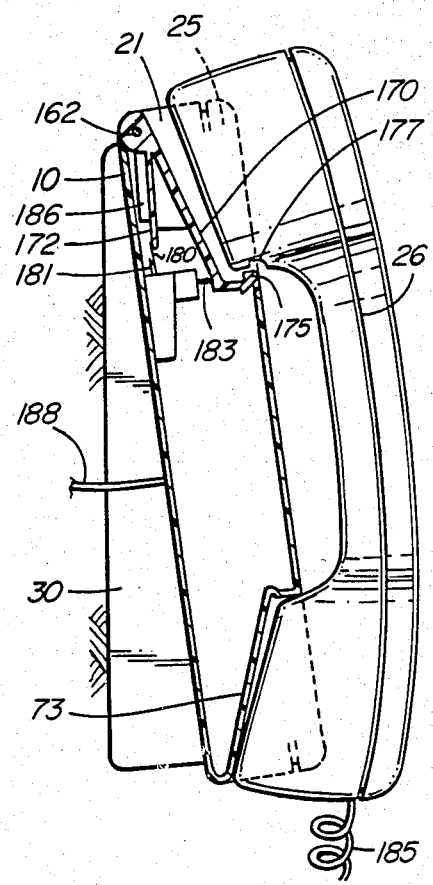
FIGS. 12 and 13 are diagrammatic illustrations of the two alternative mounting positions.

As is seen, in FIGS. 10 and 11, the cup has an inclined bottom surface 170, inclined forward and upward from its outer edge at 171, the pivots 162 indicated at this outer edge. Also extending from the outer edge, inwards, is a lever 172, the lever supported from the bottom surface 170 by ribs 173. At its inner edge the cup 21 has an upward extending lip 174 having rearwardly extending rib 175, at its top edge. Lip 174 fits in a recess 176 in the base of the U-shaped opening 161 in the top housing 25 (FIG. 1). The rib 175 engages in a slot 177 on the inner side of the housing of the handset (FIG. 13). The cup 21 is open at its rear, being aligned with the slot 160 in the bottom housing. Side walls 178 are aligned at their outer edges with the sides of the slot 160.

The hookswitch 22, in the present example, is of a form as described in U.S. Pat. No. 4,259,558, in the name of the present assignee, and the disclosure of which is included herein by specific reference. Such a switch has a plurality of sets of contact members, the contact members of a set being in stacked relationship. In FIGS. 10 and 11 a pair of contact members 180 and 181 are illustrated. Contact member 180 is extended beyond contact member 181 and is engaged at the extended portion by the inner end of lever 172. The pair of contacts 180, 181 are shown as normally open in an off hook condition and closed in an on hook condition. However, if the lower contact member 181 is extended instead of contact member 180, then a reverse contact condition can apply, that is normally closed on off hook and open on on hook. Three contact members can be stacked, the center contact member extended, to provide a transfer switch or contact arrangement.

Extending upward on the top surface of the hookswitch 28 is a hollow boss 182. A compression spring 183 is positioned in the boss 182 and bears against the underside of the bottom surface 170, a short level portion 184 being provided to form an abutment for the spring. Spring 183 biases the cup 21 upwards, at its inner edge 174, about the pivots 162.

Figure 12:
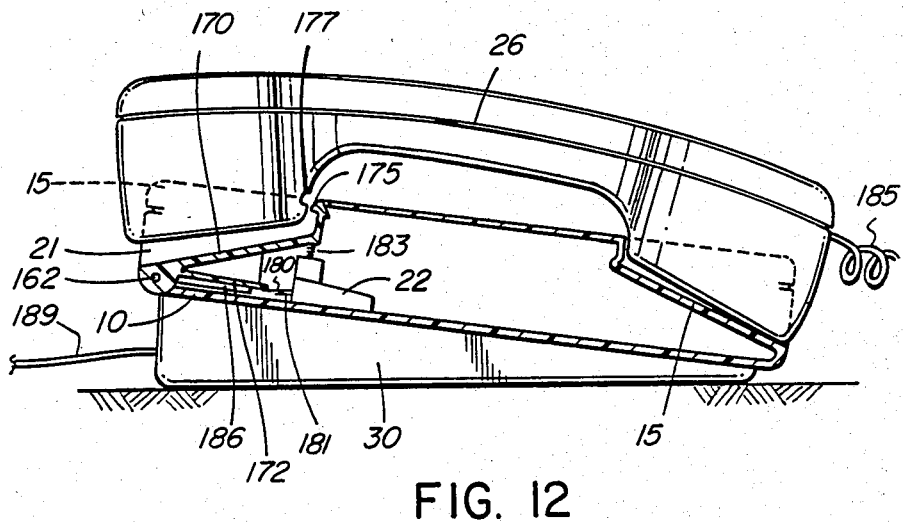

FIG. 12 is a diagrammatic illustration of a telephone set desk mounted, while FIG. 13 is a diagrammatic illustration of a telephone set wall mounted. In both Figures the receiver end of the handset is shown slightly raised from the cup 21, but this is for clarity only and the handset should be considered as touching both cups 73 and 21, and with rib 175 in the slot 177.

In FIG. 12, the handset normally rests in both cups 73 and 21, part of the weight of the handset taken by cup 73 and part by cup 21. That part of the handset weight taken by cup 21 pivots cup 21 against the spring 183 and actuates the contacts 180, 181 to the on hook condition. In FIG. 13 the whole weight of the handset is taken by the cup 21. This weight again pivots cup 21 against the spring 183 to actuate the contacts 180, 181 to the on hook condition. The lever arm through which the weight of the handset acts is shorter in FIG. 13 than in FIG. 12. Thus the extra weight experienced by the cup 21 when the telephone set wall mounted is counterbalanced by the reduced lever arm. It is possible to adjust the lever arm in both FIG. 12 and FIG. 13 by changing the length of the lever 172, relative to other dimensions. Also the depth of the cup 21 can be varied slightly, which in turn moves the lever arm through which the weight of the handset acts.

In the wall mounting position, as illustrated in FIG. 13, when the handset is in position the rib 175 is engaged in the groove 177, as described above. This tends to lock the handset in position against being displaced by knocks or jars, or by pulling on the handset cord 185. Any attempt of the handset to rotate upward from the bottom, i.e. outward and upward movement of the receiver end, creates a wedging action between rib 175 and groove 177, and the bottom surface 170 of the cup 21. But this does not interfere with correct removal of the handset. It is normally arranged that the face surface of the transmitter housing and the surface 170 of the cup 21 are substantially parallel and in contact when the handset is in position, whether wall mounted or desk mounted.

The pivotal movement of the cup 21 can be controlled. Thus one or more shallow ribs 186 can be provided on the bottom surface of the lever 172. An alternative is to arrange for the portion 184—abutment for the spring 183—to contact the top surface 187 of the boss 182. The line cord to the telephone set is normally via a wall outlet, when wall mounted, as indicated diagrammatically at 188 in FIG. 13. In the desk mounting mode, the line cord can be fed via the wedge-shaped adaptor, as illustrated at 189 in FIG. 12.

One form of cup 21 is effective for both wall and desk mounting and there is provided an integral cup and hookswitch actuator which is fully acceptable for both wall and desk mounting of a telephone set and gives accepted contact loading of the hookswitch in either mounting configuration.

The groove 177 can also be arranged to engage over a rib along the top edge of the top housing 15, so that the handset can be hung on the telephone set base, when wall mounted, in an off hook condition. This can be useful when a third party is being called to the telephone. This avoids leaving the handset dangling on the handset cord.

Figure 14:
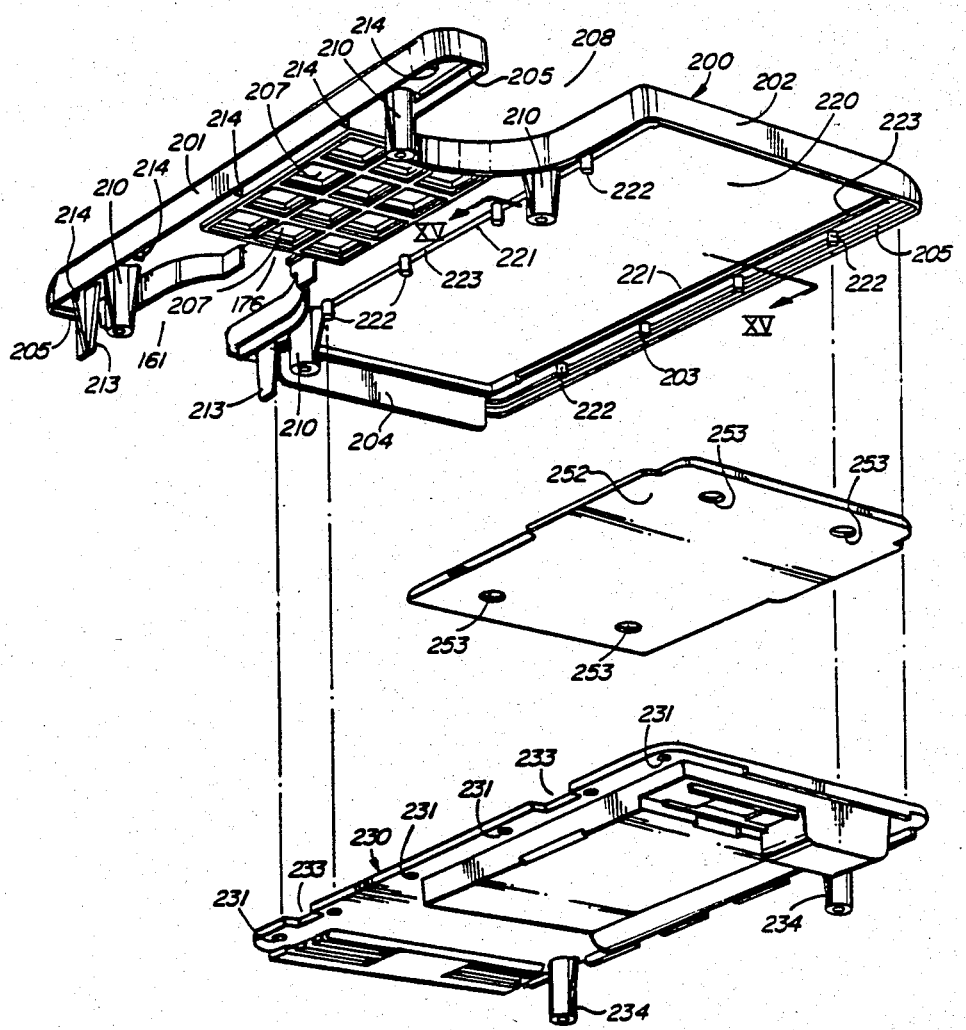
FIG. 14 is an exploded perspective view of one form of top housing assembly, viewed from underneath.
Figure 15:
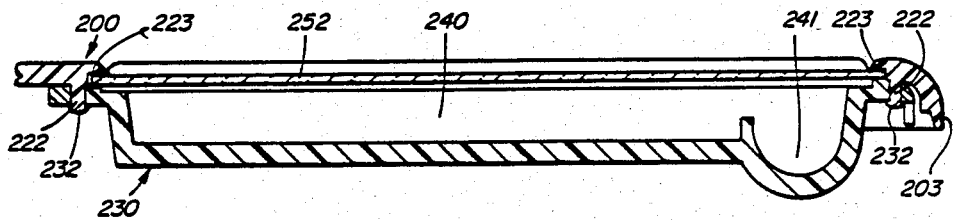
FIG. 15 is a cross-section on the line XV—XV of FIG. 14.

The top housing assembly 25 is seen in more detail in FIGS. 14 and 15. In the example, the assembly comprises a top housing 200 which has short sides or walls 201, 202, 203 and 204 which rest on the walls of the bottom housing, a peripherally extending recess or ledge 205 accepting a rim 206 (FIG. 1) extending up at the top of the walls of the bottom housing. The top housing 200 has, at one side, a bezel formation defining a plurality of apertures 207 for pushbuttons of the dial assembly 19 (FIG. 1). Also at this side is the U-shaped opening 161 and a further opening 208, through which pass the receiver and transmitter portions respectively, of the handset 26. In the example, pillars 210 sit on their bottom surfaces on the bottom surface 11 of the bottom housing, the top housing held in place by screws 211 (FIG. 1) passing through the bores of bosses 212 (FIG. 1) into the pillars 210. Two beams 213 entered down, one on either side of the opening 209, and hold the pivot members 162 in the slots 163. Small projections 214 alongside 201 rest on the inside of the rims 206 to locate wall 201 and wall 12 of the bottom housing.

On the other side of the top housing is a large rectangular opening 220, only a relatively small frame structure remaining on three sides. Depending down from the undersurface adjacent to the two long sides 221 of the opening are small pins 222. Also extending along each side 221 is a groove or recess 223, the use of which will be described later.

Figure 16:
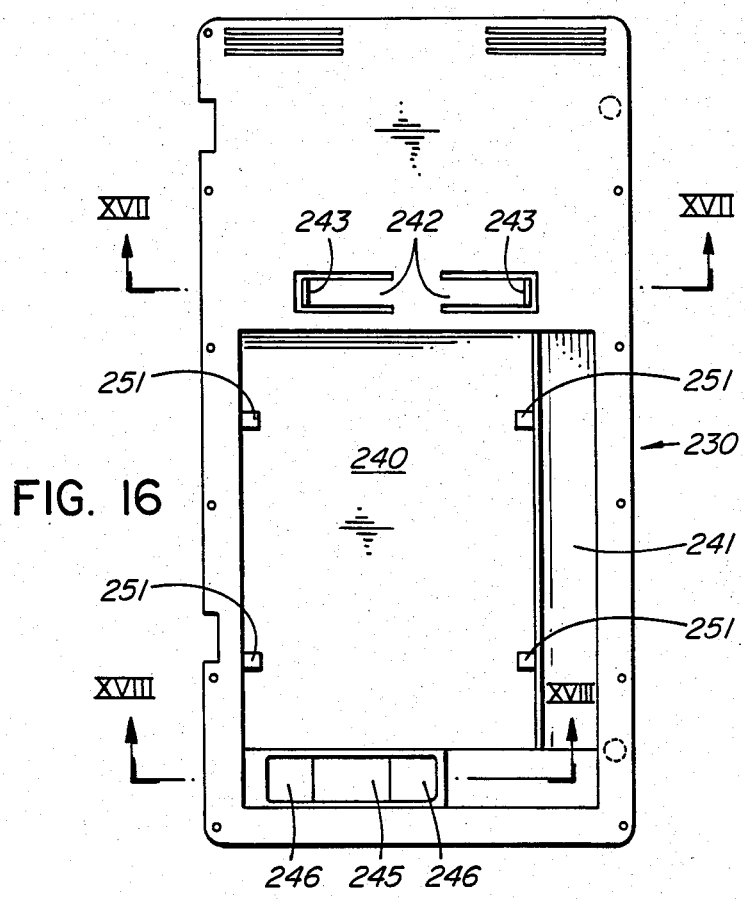
FIG. 16 is a top plan view of the insert for the top housing.
Figure 17:
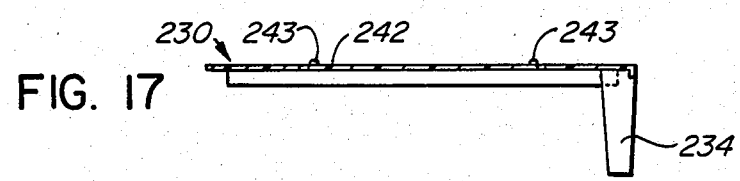
FIG. 17 is a cross-section on the line XVII—XVII of FIG. 16.
Figure 18:
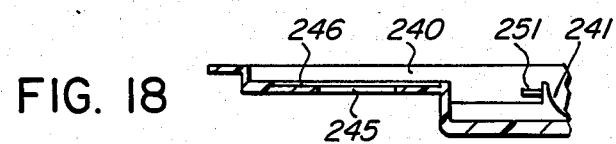
FIG. 18 is a cross-section on the line XVIII—XVIII of FIG. 16.

Attached to the top housing, in the example illustrated, is an insert 230, illustrated in FIGS. 16, 17 and 18. The insert 230 has small holes 231 along each side which fit over the pins 222 on the top housing. By forming over the ends of the pins—generally referred to as welding, as illustrated at 232 in FIG. 15, the insert is attached to the top housing. Recesses 233 at one side provide clearance for two of the pillars 210. At the other side are two further pillars 234 which also rest on the bottom surface of the bottom housing, screws 235 passing through the bores of bosses 236 (FIG. 1) into the pillars 234.

The insert has a recess 240 towards the front end and a semicylindrical groove 241 extends along one side of the recess. Positioned near the back end of the recess 240 are two resilient levers 242 housing small protrusions 243 at their ends. Between the recess 240 and the front end of the insert is a sliding actuator 244 (FIG. 1). The actuator is not shown in FIGS. 14, 16 and 18, for clarity. The actuator slides in an aperture 245 formed in a shallow recess 246 at the front end of the insert. The actuator 244 is seen in more detail in FIG. 1. It has a flat web portion 247 which sits in, and slides in, the recess 246. Extending downward are two spaced ribs 248, which engage over the sliding control member 96 of the volume control. On the top surface are two ridges 249 which assist in moving, that is sliding, the actuator. Extending down on each side of the actuator, from the web portion 247, and intermediate the ribs 248, is a deflectable clip 250. The clip is generally in the form of a hook, extending outwards and has a downward and inwardly inclined bottom surface. The actuator is assembled to the insert by pushing down on the actuator, the clips deflecting inward as they are pushed through the apertures 245, the clips then snapping outward for the hooked portions to engage under the insert.

In the recess 240 there are four small laterally extending projections 251 spaced a very small distance from the bottom surface of the recess. These hold the notepad in place, the stiff back member of the pad sliding under the projections.

When the insert is assembled to the top housing, the top surface of the insert, with the recesses 223 along each side of the opening 220, defines a groove at each side. Slidably positioned in the grooves is a sliding cover 252. The cover 252 slides from a front or lower position where it covers the pad 31 and pencil 32, to a back or upper position which encases the pad and pencil. Small recesses are formed in the lower surface of the cover, near the front and rear edges. These recesses, indicated at 253 in FIG. 14, cooperate with the protrusions 243 on the levers 242 to retain the cover either in the open or closed position. The cover has a ridge 254 on its upper surface to assist in sliding of the cover.

When the insert is assembled to the top housing it is only held in place, at least along one side, by the pins 222. These are very small. Once the telephone set base is assembled, with the top housing assembly on the bottom housing, it could be very easy to break the insert away from the top housing, as by a hard knock or by a heavy weight being placed on the top housing. Telephone sets are often subject to severe handling. To reduce the possibility of such damage, support members are provided around the periphery of the bottom housing, and at other positions, the insert resting on these support members when the telephone set base is assembled. Typical support members are shown at 225 in FIG. 1.

At the thicker end of the adaptor 30, a wide slot or opening 260 is provided. When assembled to the bottom housing for a desk or similar type of mounting, there is provided an opening into which fingers of a user can be inserted to make lifting and carrying of the telephone set easier.

If desired conductor routing can be provided in the bottom housing by including posts on the bottom surface. This would prevent conductors interfering with items or components on assembly.

The minimum depth of the telephone set base is set, in the present example, by the overall depth or thickness of the dial assembly. If the dial has a flush back surface with no protruding terminals, it is likely to be at a minimum thickness. However if projecting terminals are provided, as will accept spade type connectors on the ends of conductors for example, then problems may arise. The adaptor enables a dropped area to be provided in the bottom surface of the bottom housing. This is seen in FIG. 1 where one side of the recess is seen at 255 and one end at 256. This dropped area is wholly within the periphery of the adaptor 30 and is therefore not seen from outside and causes no problems. The size and position of tne dropped area can be varied.

An advantage that occurs with providing the insert 230 as a separate member, is that different forms of insert can be provided, for different services. Thus if some other service, such as some amount of repertory dialing or other feature, is to be provided in some telephone sets, then a different insert 230 can be provided. This would be more convenient and less expensive than having to have a completely new top housing for each different service requirement.

What is claimed is:
1. A telephone set base comprising;
   a bottom housing having a bottom surface, exposed side and end walls extending up from the bottom surface, said exposed side and end walls having a top edge,
   a top housing attached to the top of said bottom housing, said top housing having a top surface and depending exposed side and end walls, said depending side and end walls having a bottom edge engaging said top edge of said bottom housing exposed side and end walls,
   a wedge-shaped adaptor attached to the bottom of the bottom housing, said adaptor having a bottom surface and upwardly extending exposed side and end walls, one of said adaptor end walls being of greater height than another of said adaptor end walls to form said wedge shape, said upwardly extending side and end walls including a peripherally extending top edge, said peripherally extending top edge of the adaptor engaging said bottom surface of said bottom housing, and
   means releasably attaching said adaptor to said bottom housing, such that said adaptor can be mounted in either of two alternate positions with the higher end wall of the wedge shape alternatively at the front and the back of the bottom housing.

2. A base as claimed in claim 1, said means releasably attaching said adaptor comprising;
   a plurality of spaced hook members extending up from said adaptor;
   a plurality of apertures in the bottom surface of said bottom housing and positioned to receive said hook members;
   a first boss on said bottom surface of said bottom housing adjacent the front of the bottom housing and a second boss adjacent the back of the bottom housing;
   a screw positioned in said adaptor adjacent an end thereof and engaging in one of the bosses with said hook members in said apertures and engaged over said bottom surface of said bottom housing.

3. A base as claimed in claim 1, including; a groove in the outer bottom surface of said bottom housing along each side thereof and a rib on the top surface of each side wall of said adaptor, the ribs positioned in said grooves.

4. A base as claimed in claim 1, including a central aperture in the bottom surface of the adaptor, and a jack in the bottom housing, aligned with said central aperture.

5. A base as claimed in claim 4, including at least one aperture in said adaptor at the higher end wall of the wedge shape, for passage of a modular plug and line cord therethrough.

6. A base as claimed in claim 4, including a further jack positioned at the front end of said bottom housing and an aperture in a front wall of the bottom housing for access to said further jack.

7. A base as claimed in claim 1, said adaptor including an opening at the higher end wall of the wedge shape, said opening providing access for fingers of a user to carry the base.

8. A base as claimed in claim 1, said adaptor of hollow form and having an open upper surface, said bottom housing having a downward projecting extension on its outer bottom surface, extending into said adaptor.

9. A base as claimed in claim 1, including a dial extending through said top housing and a mounting in said bottom housing, said dial attached to said mounting, said mounting comprising:
   two opposed spaced apart support brackets extending up from the bottom surface of the bottom housing, each support bracket including two guide formations spaced apart in a direction normal to the spacing of the support brackets, and a latch member positioned between the guide formations; each latch member including a latch surface spaced from said bottom surface, the latch surfaces projecting inwardly towards each other, and a downwardly and inwardly inclined surface leading to an inner edge of the latch surface; at least one of said latch members being resiliently deflectable; and
   two cooperating mounting brackets extending down one on each side of said dial, each mounting bracket including guide formations for cooperating with the guide formations on said support brackets and also a recess for reception of one of said latch surfaces.

10. A mounting as claimed in claim 9, one of said support brackets being unitary with a side wall of said bottom housing.

11. A mounting as claimed in claim 9, at least one of said support brackets comprising a channel-shaped member having a back flange and two parallel spaced apart webs extending forward from said back flange, towards the other support brackets, said spaced apart webs forming said guide formations.

12. A telephone set base set comprising:

a bottom housing, a top housing attached to the top of said bottom housing, a wedge shaped adaptor attached to the bottom of the bottom housing, means releasably attaching said adaptor to said bottom housing, said means adapted to attach said adaptor in either of two alternate positions with the thin edge of the wedge shape alternatively at the front and the back of the bottom housing; and an integral cup and hookswitch comprising;

a cup for receiving one end of a handset, said cup including a bottom surface and a lever extending below said bottom surface and having an inner end;

means pivotally mounting said cup, at an outer edge, on said bottom housing, for pivotal movement about an axis parallel to said outer edge, said lever extending inward from said axis;

a switch positioned in said bottom housing, said switch including contact actuating members extending beneath said inner end of said lever;

means resiliently biasing said cup about said axis to move said lever inner end upward to actuate said switch to an off hook condition;

replacement of a handset pivoting said cup against said resilient biasing means to move said lever inner end downward and actuate said switch to an on hook condition.

13. A base as claimed in claim 12, said cup pivotally mounted at a rear edge of said bottom housing.

14. A base as claimed in claim 12, said bottom housing having a bottom surface, said switch mounted on said bottom surface, and said cup pivotally mounted at a rear edge of said bottom surface.

15. A base as claimed in claim 12, the bottom housing having a slot in a rear wall, said slot extending to said bottom surface, said cup including side walls, said side walls aligned at their outer edges with the sides of said slot.

16. A base as claimed in claim 12, said lever extending below and spaced from said bottom surface of said cup, and at least a rib on the bottom surface of said lever, said rib contacting the bottom surface of the bottom housing in an on hook condition.

17. A base as claimed in claim 1, including a cup formed on the inner bottom surface of the bottom housing, a tone ringer positioned in said cup and a cover over said ringer, retaining said ringer in said cup.

18. A base as claimed in claim 1, said top housing further comprising, a bezel formation at one side of the top surface defining a plurality of apertures for pushbuttons and a rectangular opening at the other side of the top surface; and said base further including an insert extending under said rectangular opening and attached to the top housing.

19. A base as claimed in claim 1, said top housing having two U-shaped openings, one at a front edge and one at a rear edge, for reception of receiver and transmitter transducer housings of a handset.

20. A base as claimed in claim 1, including an actuator mounted in said top housing said actuator engaged with and actuating a volume control member in said bottom housing.

21. A base as claimed in claim 1, including two mounting apertures in said adaptor, each said mounting aperture of keyhole formation and comprising a circular aperture portion and a waisted slot portion, the slot portion narrower than the diameter of the circular aperture portion and positioned above the circular aperture portion when the base is in a wall mounting position, said waisted slot portion defined by two spaced resilient members.

22. A base as claimed in claim 21, said resilient members each comprising a first arcuate portion defining part of the circumference of the circular aperture portion and an end portion curved around and outwards whereby the two resilient members present convex surfaces in opposition.

23. A base as claimed in claim 21, said mounting apertures spaced apart along a longitudinal axis of the adaptor, one of said apertures positioned near an end of the adaptor, said end being the top end in a wall mounting mode, the other of said mounting apertures having an elongate slot portion including two waisted portions, one at each end of the slot portion, a first waisted portion immediately adjacent to the circular aperture portion and defined by said two spaced resilient members, the second waisted portion defined by opposed resilient, arcuate members.

24. A base as claimed in claim 1, wherein the side and end walls of said bottom housing, top housing and adaptor are substantially in alignment.

25. A base as claimed in claim 24, wherein the adaptor is generally hollow and supports said bottom housing at a position spaced from a bottom wall of the adaptor.

* * * * *